US011065853B2

(12) United States Patent
Hara et al.

(10) Patent No.: US 11,065,853 B2
(45) Date of Patent: Jul. 20, 2021

(54) POLYIMIDE FILM LAYERED BODY

(71) Applicant: TOYOBO CO., LTD., Osaka (JP)

(72) Inventors: Shota Hara, Otsu (JP); Toshiyuki Tsuchiya, Otsu (JP); Masahiro Yamashita, Otsu (JP); Tetsuo Okuyama, Otsu (JP); Naoki Watanabe, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 76 days.

(21) Appl. No.: 16/096,490

(22) PCT Filed: Apr. 24, 2017

(86) PCT No.: PCT/JP2017/016155
§ 371 (c)(1),
(2) Date: Oct. 25, 2018

(87) PCT Pub. No.: WO2017/188174
PCT Pub. Date: Nov. 2, 2017

(65) Prior Publication Data
US 2019/0134963 A1    May 9, 2019

(30) Foreign Application Priority Data

Apr. 28, 2016   (JP) .............................. JP2016-090555

(51) Int. Cl.
B32B 27/28      (2006.01)
B32B 7/12       (2006.01)
B32B 27/00      (2006.01)

(52) U.S. Cl.
CPC .............. *B32B 27/281* (2013.01); *B32B 7/12* (2013.01); *B32B 27/00* (2013.01); *B32B 2250/05* (2013.01); *B32B 2250/24* (2013.01); *B32B 2255/10* (2013.01); *B32B 2255/24* (2013.01); *B32B 2307/306* (2013.01); *B32B 2307/308* (2013.01)

(58) Field of Classification Search
CPC ......... B32B 27/281; B32B 27/00; B32B 7/12; B32B 2307/306; B32B 2307/308; B32B 2457/14; B32B 2605/00; B32B 2605/18; B32B 2264/105; B32B 2264/102; B32B 2264/104; B32B 2264/101; B32B 2307/206; B32B 2307/54; B32B 2307/734; B32B 2307/732; B32B 2307/558; B32B 2457/04; B32B 2457/08; B32B 2250/05; B32B 2250/24; B32B 2255/10; B32B 2255/26; B32B 25/08; B32B 27/16; B32B 27/34; B29C 66/026; B29C 65/02; B29C 66/45; B29C 66/1122; B29C 66/71
See application file for complete search history.

(56) References Cited

U.S. PATENT DOCUMENTS

| 4,543,295 | A | * | 9/1985 | St. Clair | ................. B32B 27/34 156/307.7 |
| 4,788,098 | A |   | 11/1988 | Sado et al. | |
| 5,326,643 | A | * | 7/1994 | Adamopoulos | .... C08G 73/1003 428/209 |
| 5,527,621 | A | * | 6/1996 | Matsuura | ............... B05D 3/101 428/473.5 |
| 2004/0071992 | A1 | | 4/2004 | Zinbo et al. | |
| 2014/0041800 | A1 | | 2/2014 | Okuyama et al. | |
| 2017/0225433 | A1 | | 8/2017 | Okuyama et al. | |

FOREIGN PATENT DOCUMENTS

| JP | H05-059815 B2 | 9/1993 |
| JP | H11-048423 A | 2/1999 |
| JP | 2002-234126 A | 8/2002 |
| JP | 4123665 B2 | 7/2008 |
| JP | 4168562 B2 | 10/2008 |
| WO | WO 2012/141248 A1 | 10/2012 |
| WO | WO 2016/031746 A1 | 3/2016 |

OTHER PUBLICATIONS

Japanese Patent Office, Notice of Reasons for Refusal in Japanese Patent Application No. 2018-514578 (dated May 15, 2019).
Japanese Patent Office, International Search Report in International Patent Application No. PCT/JP2017/016155 (dated Jun. 13, 2017).
European Patent Office, Extended European Search Report in European Patent Application No. 17789456.5 (dated Nov. 21, 2019).
Japanese Patent Office, Notice of Reasons for Refusal in Japanese Patent Application No. 2018-514578 (dated Dec. 20, 2019).
European Patent Office, Communication Pursuant to Article 94(3) EPC in European Patent Application No. 17789456.5 (dated Jun. 9, 2020).

* cited by examiner

*Primary Examiner* — John D Freeman
(74) *Attorney, Agent, or Firm* — Leydig, Voit & Mayer, Ltd.

(57) ABSTRACT

A laminate mainly made of polyimide with low thermal expansion, high mechanical strength, and high heat resistance, and a method for manufacturing the same are provided. A surface of a polyimide film is activated and then treated by a silane coupling agent. Subsequently, the obtained silane coupling agent-treated polyimide films are superimposed, and pressure and heat are applied to the superimposed polyimide films so as to manufacture a polyimide film laminate. The obtained polyimide film laminate has a cross-sectional structure of superimposing polyimide film layers and silane coupling agent condensate layer(s) alternately to each other. Adhesive strength between the polyimide films of the polyimide film laminate of the present invention does not change largely from initial adhesive strength even after heat treatment at 400° C. for 15 minutes. Further, the polyimide film laminate exhibits a high bending elastic modulus and impact resistance.

4 Claims, 1 Drawing Sheet

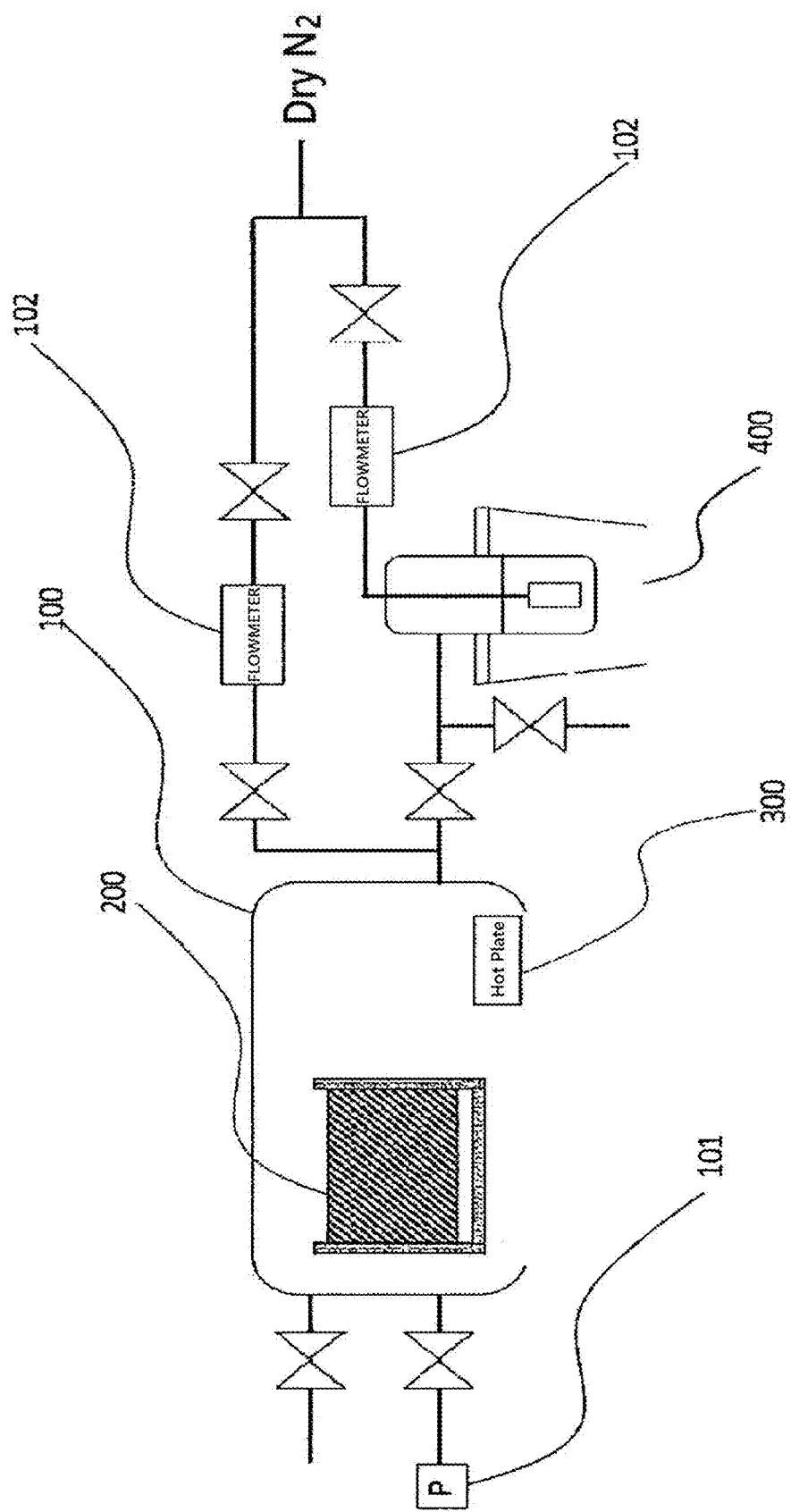

POLYIMIDE FILM LAYERED BODY

CROSS-REFERENCE TO RELATED APPLICATIONS

This patent application is the U.S. national phase of International Patent Application No. PCT/JP2017/016155, filed Apr. 24, 2017, which claims the benefit of Japanese Patent Application No. 2016-090555, filed on Apr. 28, 2016, which are incorporated by reference in their entireties herein.

TECHNICAL FIELD

The present invention relates to a laminate obtained by bonding plural polyimide films with each other, and further specifically relates to a polyimide film laminate having high heat resistance.

BACKGROUND ART

Since physical property change of polyimide films is extremely small in a wide temperature range from −269° C. to 300° C., applications and uses of polyimide films in the electrical and electronic fields have been increasing. In the electrical field, they are used for, for example, insulation of coil in motors for vehicle, industrial motors and the like, and insulation of electric cables in airplanes and superconductive wires and the like. Whereas, in the electronic field, they are utilized for, for example, flexible printed circuit boards, base films of semiconductor mounting film carriers and the like. As described above, the polyimide films, which have significantly high reliability among various kinds of functional polymer films, are broadly used in the electrical and electronic fields.

Polyimide films are mainly manufactured by solution film forming by flow casting, and according to the manufacturing method, it has been difficult to form thick films, or productivity thereof has been extremely low.

As a means for the improvement, a polyimide board, which is obtained by bonding thermoplastic polyimide films that have comparatively low glass transition points directly with each other by heat and pressure with no adhesive therebetween, has been proposed. This polyimide board has not satisfied dimensional stability, mechanical characteristic (bending elastic modulus) or adhesiveness required for the application to ceramic or glass alternate materials. Moreover, prior art pointed out a problem that, if increasing its thickness, its adhesiveness further degrades and its warp becomes larger (see Patent Document 1).

In order to solve this problem, a polyimide board obtained by laminating plural nonthermoplastic polyimide films via an acrylic resin-based adhesive or an epoxy resin-based adhesive has been suggested. This polyimide board has not been practical, because its adhesiveness is sufficient but its mechanical characteristic (bending elastic modulus) is considerably low. Further, its dimensional stability is not sufficient.

Moreover, a polyimide board, which is obtained by laminating plural nonthermoplastic polyimide films via a thermoplastic adhesive containing polyimidesiloxane and at least one kind of an epoxy resin, a bismaleimide-triazine resin, a bismaleimide resin, a cyanate resin and an acrylate resin, has been suggested. This polyimide board exhibits sufficient adhesiveness, but its mechanical characteristic (bending elastic modulus) and dimensional stability are not satisfactory (see Patent Document 2).

Furthermore, a polyimide board, which is obtained by bonding two or more thermocompressive multilayer polyimide films (surface layer: thermoplastic polyimide, base layer: nonthermoplastic polyimide) by heat and pressure, has been suggested. Also, this polyimide board similarly fails to exhibit a satisfactory mechanical characteristic (bending elastic modulus) and dimensional stability (see Patent Document 3).

As improvement for these polyimide boards, a polyimide board obtained by superimposing at least two polyimide films whose surfaces are treated by plasma and bonding them directly with each other by heat and pressure with no adhesive therebetween has been suggested. Since this polyimide board does not adopt interlayer adhesive, its dimensional stability is sufficient, but its mechanical characteristic (bending elastic modulus) is not satisfactory (see Patent Document 4).

PRIOR ART DOCUMENTS

Patent Documents

Patent Document 1: JP-B-5-59815
Patent Document 2: JP-B-4168562
Patent Document 3: JP-B-4123665
Patent Document 4: JP-A-2002-234126

DISCLOSURE OF THE INVENTION

Problems to be Solved by the Invention

The present invention aims to provide a polyimide film laminate having excellent dimensional stability, mechanical characteristic (bending elastic modulus), heat resistance and impact strength as a ceramic or glass alternate material.

Means for Solving the Problems

That is, the present invention has a following structure.
[1] A polyimide film laminate, including a structure of superimposing plural polyimide film layers and silane coupling agent condensate layer(s) alternately to each other, wherein a thickness of each of the polyimide film layers is 3 μm or more and 250 μm or less, initial adhesive strength between the polyimide film layers is 0.1 N/cm or more and 20 N/cm or less by a 90° peel method, and adhesive strength between the polyimide film layers after being heated at 400° C. for 15 minutes is 20% or more and 200% or less of the initial adhesive strength.
[2] The polyimide film laminate according to [1], wherein a thickness of the silane coupling agent condensate layer is 5 nm or more and 300 nm or less.
[3] A method for manufacturing a polyimide film laminate, the method including at least:
(1) producing a silane coupling agent layer on a surface of a polyimide film; and
(2) superimposing a plurality of the polyimide films after the production of the silane coupling agent layers, and applying heat and pressure to the superimposed polyimide films.
[4] The method for manufacturing a polyimide film laminate according to [3], wherein the step of (1) producing the silane coupling agent layer on the surface of the polyimide film is carried out by exposing the surface of the polyimide film to a vaporized silane coupling agent.

Effect of the Invention

The present invention relates to a polyimide film laminate, which is obtained by using a bond generated by a chemical reaction between an extremely thin silane coupling agent layer and an active group on a surface of the polyimide film. A thickness of the silane coupling agent is extremely thin, and thus hardly affects a macroscopic property of the laminate. Further, since an absolute amount of the silane coupling agent is extremely small, an amount of a low molecular component generated during condensation of the silane coupling agent and an amount of a decomposition product generated during high temperature exposure of the silane coupling agent are also small, so that the low molecular component and the decomposition product are solved and absorbed into the polyimide film layer, thereby causing no blister or the like. Also in the case where the component of the silane coupling agent layer is thermally decomposed, due to high reactivity of a new active group that is generated as a result of the decomposition, a new bond with the active part of the surface of the polyimide film layer is generated during the decomposition, so that exfoliation between the polyimide film layers does not consequently proceed even during the high temperature exposure.

Due to the above-described effects, the polyimide film laminate having the high dimensional stability, mechanical characteristic (bending elastic modulus) and heat resistance and substitutable for inorganic substances such as ceramic and glass, which cannot be achieved by conventional polyimide boards, can be obtained. Further, the polyimide laminate of the present invention also has excellent impact resistance, and thus can be applied also to a part which has been difficult for the inorganic material such as ceramic and glass to be applied.

BRIEF DESCRIPTION OF THE DRAWINGS

The FIGURE is a schematic block diagram illustrating an example of an apparatus that is used for a silane coupling agent treating method via gas phase in the present invention.

MODE FOR CARRYING OUT THE INVENTION

<Silane Coupling Agent>

A silane coupling agent in the present invention means a compound which has a silicon element in its molecule, and acts to enhance adhesive strength between polyimide films by physically and chemically intervening the polyimide films.

Preferable examples of the silane coupling agent include: N-2-(aminoethyl)-3-aminopropylmethyldimethoxysilane; N-2-(aminoethyl)-3-aminopropyltrimethoxysilane; N-2-(aminoethyl)-3-aminopropyltriethoxysilane; 3-aminopropyltrimethoxysilane; 3-aminopropyltriethoxysilane; 3-triethoxysilyl-N-(1,3-dimethyl-butylidene)propylamine; 2-(3,4-epoxycyclohexyl)ethyltrimethoxysilane; 3-glycidoxypropyltrimethoxysilane; 3-glycidoxypropylmethyldiethoxysilane; 3-glycidoxypropyltriethoxysilane; vinyltrichlorosilane; vinyltrimethoxysilane; vinyltriethoxysilane; 2-(3,4-epoxycyclohexyl)ethyltrimethoxysilane; 3-glycidoxypropyltrimethoxysilane; 3-glycidoxypropylmethyldiethoxysilane; 3-glycidoxypropyltriethoxysilane; p-styryltrimethoxysilane; 3-methacryloxypropylmethyldimethoxysilane; 3-methacryloxypropyltrimethoxysilane; 3-methacryloxypropylmethyldiethoxysilane; 3-methacryloxypropyltriethoxysilane; 3-acryloxypropyltrimethoxysilane; N-phenyl-3-aminopropyltrimethoxysilane; N-(vinylbenzyl)-2-aminoethyl-3-aminopropyltrimethoxysilane hydrochloride; 3-ureidopropyltriethoxysilane; 3-chloropropyltrimethoxysilane; 3-mercaptopropylmethyldimethoxysilane; 3-mercaptopropyltrimethoxysilane; bis(triethoxysilylpropyl)tetrasulfide; 3-isocyanatopropyltriethoxysilane; tris-(3-trimethoxysilylpropyl)isocyanurate; chloromethyl phenethyl trimethoxysilane; chloromethyl trimethoxysilane; aminophenyl trimethoxysilane; aminophenethyl trimethoxysilane; aminophenyl aminomethyl phenethyltrimethoxysilane; hexamethyldisilazane; and the like.

As the silane coupling agent that can be used in the present invention, beside the above-described silane coupling agents, n-propyltrimethoxysilane, butyltrichlorosilane, 2-cyanoethyltriethoxysilane, cyclohexyltrichlorosilane, decyltrichlorosilane, diacetoxydimethylsilane, diethoxydimethylsilane, dimethoxydimethylsilane, dimethoxydiphenylsilane, dimethoxymethylphenylsilane, dodecylrichlorosilane, dodecyltrimethoxysilane, ethyltrichlorosilane, hexyltrimethoxysilane, octadecyltriethoxysilane, octadecyltrimethoxysilane, n-octyltrichlorosilane, n-octyltriethoxysilane, n-octyltrimethoxysilane, triethoxyethylsilane, triethoxymethylsilane, trimethoxymethylsilane, trimethoxyphenylsilane, pentyltriethoxysilane, pentyltrichlorosilane, triacetoxymethylsilane, trichlorohexylsilane, trichloromethylsilane, trichlorooctadecylsilane, trichloropropylsilane, trichlorotetradecylsilane, trimethoxypropylsilane, allyltrichlorosilane, allyltriethoxysilane, allyltrimethoxysilane, diethoxymethylvinylsilane, dimethoxymethylvinylsilane, trichlorovinylsilane, triethoxyvinylsilane, vinyltris(2-methoxyethoxy)silane, trichloro-2-cyanoethylsilane, diethoxy(3-glycidyloxypropyl)methylsilane, 3-glycidyloxypropyl(dimethoxy)methylsilane, 3-glycidyloxypropyltrimethoxysilane and the like can also be used.

Further, other alkoxysilanes, for example, tetramethoxysilane, tetraethoxysilane or the like can be added as appropriate into the silane coupling agent.

Moreover, either in the case of adding the other alkoxysilanes, for example, tetramethoxysilane, tetraethoxysilane or the like as appropriate into the silane coupling agent or in the case of not adding them, the silane coupling agent may be added also after slightly proceeding the reaction by mixing and heating operations.

Among the above-described silane coupling agents, the silane coupling agents having chemical structures which include one silicon atom in one molecule are preferably used in the present invention.

In the present invention, examples of the particularly preferable silane coupling agents include: N-2-(aminoethyl)-3-aminopropylmethyldimethoxysilane; N-2-(aminoethyl)-3-aminopropyltrimethoxysilane; N-2-(aminoethyl)-3-aminopropyltriethoxysilane; 3-aminopropyltrimethoxysilane; 3-aminopropyltriethoxysilane; 3-triethoxysilyl-N-(1,3-dimethyl-butylidene)propylamine; 2-(3,4-epoxycyclohexyl)ethyltrimethoxysilane; 3-glycidoxypropyltrimethoxysilane; 3-glycidoxypropylmethyldiethoxysilane; 3-glycidoxypropyltriethoxysilane; aminophenyl trimethoxysilane; aminophenethyl trimethoxysilane; aminophenyl aminomethyl phenethyltrimethoxysilane; and the like. In the case where particularly high heat resistance is required in a process, the silane coupling agent having a structure in which an Si atom and an amino group are linked by an aromatic group is preferable.

Incidentally, in the present invention, a phosphorus coupling agent, a titanate coupling agent or the like can be used in combination, if necessary.

<Silane Coupling Agent Treatment>

Generally, silane coupling agent treatment denotes treatment for forming a thin film layer of a silane coupling agent or a condensate of a silane coupling agent onto a surface of an object.

The silane coupling agent treatment is generally carried out by: solving a silane coupling agent into alcohol or the like so as to make a solution; applying the silane coupling agent solution to an object or applying the silane coupling agent by immersing the object into the solution or the like; and subsequently drying and heating the solution so as to condense the silane coupling agent and allow the silane coupling agent to bond with a surface of the object by a chemical reaction at the same time.

Typical methods for applying the silane coupling agent include a spin coating method, a spray coating method, a capillary coating method, a dip method, and the like.

The silane coupling agent treatment is performed to one surface or both surfaces of the polyimide film as necessary.

In the present invention, the silane coupling agent application process can be preferably performed via gas phase. The "via gas phase" means that the polyimide film is exposed to a vaporized silane coupling agent. The "vaporized" means a state where vapor of the silane coupling agent, that is, the silane coupling agent substantially in a gas state or in a fine particle state exists. Then, the exposure to the vaporized silane coupling agent means contacting the polyimide film with an atmosphere containing the vaporized silane coupling agent. Since the silane coupling agent has certain vapor pressure, a certain amount of the silane coupling agent in the gas state exists even under a normal temperature atmosphere. If increasing a temperature of the silane coupling agent in a liquid state from 40° C. to a boiling point of the silane coupling agent, vapor of the silane coupling agent with a higher concentration can be obtained. The vaporized silane coupling agent may also be atomized in relation to its dew point so as to exist in a fine particle state in the gas. In the present invention, this state can be utilized as well. Further, a process for increasing vapor density by controlling its temperature and pressure can be added. The boiling point of the silane coupling agent is varied according to its chemical structure, and ranges from about 100° C. to about 250° C. However, heating at 200° C. or more is not preferable, because a side reaction of an organic group of the silane coupling agent may be caused.

An environment for warming the silane coupling agent may be under either of applied pressure, substantially normal pressure and reduced pressure, but in order to proceed the vaporization of the silane coupling agent, the silane coupling agent is preferably warmed under substantially normal pressure or reduced pressure. Since many of the silane coupling agents are flammable liquid, they are preferably vaporized in a sealed container, which is preferably replaced with inert gas in advance. However, in the light of the improvement of the production efficiency or the reduction of the production facility cost, the silane coupling agent application is preferably carried out in environment without a vacuum. A silane coupling agent deposition method without a vacuum in the present invention does not mean not using a vacuum only during the deposition, but means that substantially atmospheric pressure is maintained from the time of setting the polyimide film normally in the atmosphere, replacing the atmosphere with carrier gas and depositing the silane coupling agent, until returning to the state where the silane coupling agent is absent.

A time period for exposing the polyimide film to the silane coupling agent is not limited particularly, but is 60 minutes or less, is preferably 20 minutes or less, and is more preferably 10 minutes or less. The exposure time is a process planned value determined by a relation between a concentration of the silane coupling agent and a required application amount of the silane coupling agent. A lower limit of the exposure time is not limited particularly, but is 10 seconds or more, and is preferably about 30 seconds or more for reducing unevenness of the application amount which is generated industrially.

A temperature of the polyimide film while being exposed to the silane coupling agent is preferably controlled to a proper temperature within a range from −50° C. to 200° C., according to the kind of the silane coupling agent and a required thickness of the silane coupling agent layer.

The polyimide film exposed to the silane coupling agent is heated preferably at 70° C. to 200° C. and more preferably at 75° C. to 150° C. after the exposure. By the heating, an alkoxy group or a silazane group of the silane coupling agent reacts with a hydroxyl group or the like on the surface of the polyimide film, thereby completing the silane coupling agent treatment. A time period required for the heating is 10 seconds or more and about 10 minutes or less. If the temperature is too high or the time period is too long, the coupling agent may be deteriorated. On the other hand, if the time period is too short, the treatment effect cannot be obtained. Incidentally, in the case where a temperature of the substrate while being exposed to the silane coupling agent is already 80° C. or more, the heating after the exposure can be omitted.

In the present invention, a surface of the polyimide film to which the silane coupling agent is to be applied is preferably held facing down, while it is exposed to the vapor of the silane coupling agent. In the conventional method in which the solution of the silane coupling agent is applied, since the surface of the polyimide film to which the solution is applied inevitably faces up before, during and after the application, a risk that foreign substances and the like floating in the working environment are settled onto the surface of the inorganic substrate cannot be excluded. However, in the present invention, the polyimide film can be held facing down, so that such settlement of foreign substances in the environment can be reduced significantly.

Further, it is also effective to adopt an operation for uniformizing distribution of the silane coupling agent and the like, in which, when the gas containing the vaporized silane coupling agent is introduced into a room for exposing the polymer substrate thereto, the gas is separated once into two or more flows, and the two or more gas flows are allowed to collide with each other in the room so as to cause turbulent flow.

As a method for vaporizing the silane coupling agent, beside the evaporation by heat, a method of introducing gas into silane coupling agent liquid so as to generate air bubbles can be employed. Hereinafter, this method will be called as bubbling. As the bubbling, it is also effective to put a pipe for allowing gas to simply pass through into the silane coupling agent liquid or a pipe with a porous body attached to its tip for generating many fine air bubbles, and to promote vaporization by superimposing ultrasonic waves.

Further, the vaporized silane coupling agent may be electrified. By adding an electric field to the film during the exposure by utilizing this effect, a larger amount of the silane coupling agent can be deposited in a short period of time, and since the silane coupling agent has kinetic energy, the deposited film can be prevented from being in an island-state. Moreover, it is known that, if the used carrier gas contains water, this water starts to react with the silane coupling agent. Thus, it is effective that its dew point is low. The dew point is favorably 15° C. or less, is more favorably 10° C. or less, and is further favorably 5° C. or less.

In a preferable form of the present invention, the number of silicon-containing foreign substances having a longer diameter of 10 μm or more, which exist in the silane coupling agent layer of the silane coupling agent layer-laminated polyimide film, is 2000/m² or less, is preferably 1000/m² or less, and is more preferably 500/m². Further, by combining the above-described operations, the preferable number of silicon-containing foreign substances can be attained.

An application amount of the silane coupling agent depends on a thickness of a silane coupling agent condensate layer. If the silane coupling agent layer is too thick, an amount of a decomposition product generated during the high temperature exposure is increased, whereby the adhesion between the polyimide films may be inhibited. The thickness of the silane coupling agent condensate layer of the present invention is preferably 5 nm or more and 1000 nm or less, and is more preferably 5 nm or more and 300 nm or less. Further, an upper limit of the thickness is preferably less than 200 nm, is preferably 150 nm or less, is preferably 100 nm or less in practical use, is more preferably 50 nm or less, and is further preferably 30 nm or less. The thickness of less than 5 nm is not preferable, because there may be a case where the coupling agent exists not as a uniform coating film but in a state of clusters.

The film thickness of the silane coupling agent condensate layer can be obtained as follows. A cross section of the polyimide film laminate which is taken in a direction perpendicular to the film surface is polished, the polished cross section is cut into a ultrathin section by using a microtome, and a photograph of the cross section is taken by using a transmission electron microscope, whereby an actual value is obtained by calculating back with magnification.

A thickness of the polyimide film of the present invention is preferably 3 μm or more, and is more preferably 11 μm or more. An upper limit of the thickness of the polyimide film is not limited particularly, but is preferably 250 μm or less for the requirement as a flexible electronic device, is more preferably 150 μm or less, and is further preferably 90 μm or less.

The polyimide film of the present invention preferably has a large area in the light of production efficiencies and costs of the laminate and the flexible electronic device. The area is preferably 1000 cm² or more, is more preferably 1500 cm² or more, and is further preferably 2000 cm² or more.

In the present invention, as the polyimide film, aromatic polyimide, alicyclic polyimide, polyamide imide, polyether imide and the like can be used.

Generally, the polyimide film is obtained by: applying solution of polyamic acid (polyimide precursor), which is obtained by a reaction between diamines and tetracarboxylic acids in a solvent, to a polyimide film-manufacturing support and drying the solution so as to form a green film (also called as a "precursor film" or a "polyamic acid film"); and treating the green film by heat at a high temperature so as to cause a dehydration ring-closure reaction on the polyimide film-manufacturing support or in a state of being peeled off from the support.

The diamines for composing the polyamic acid are not limited particularly, and aromatic diamines, aliphatic diamines, alicyclic diamines and the like which are usually used for polyimide synthesis can be used. In the light of the heat resistance, aromatic diamines are preferable, and among the aromatic diamines, aromatic diamines having benzoxazole structures are more preferable. If using the aromatic diamines having benzoxazole structures, a high elastic modulus, low heat shrinkability and a low coefficient of linear thermal expansion as well as the high heat resistance can be exhibited. The diamines can be used alone or in combination of two kinds or more.

The aromatic diamines having benzoxazole structures are not limited particularly, and examples thereof include: 5-amino-2-(p-aminophenyl)benzoxazole; 6-amino-2-(p-aminophenyl)benzoxazole; 5-amino-2-(m-aminophenyl) benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl) benzo[1,2-d:5,4-d']bisoxazole; 2,6-(4,4'-diaminodiphenyl) benzo[1,2-d:4,5-d']bisoxazole; 2,6-(3,4'-diaminodiphenyl) benzo[1,2-d:5,4-d']bisoxazole; 2,6-(3,4'-diaminodiphenyl) benzo[1,2-d:4,5-d']bisoxazole; 2,6-(3,3'-diaminodiphenyl) benzo[1,2-d:5,4-d']bisoxazole; 2,6-(3,3'-diaminodiphenyl) benzo[1,2-d:4,5-d']bisoxazole; and the like.

Examples of the aromatic diamines except the above-described aromatic diamines having the benzoxazole structures include: 2,2'-dimethyl-4,4'-diaminobiphenyl; 1,4-bis [2-(4-aminophenyl)-2-propyl]benzene(bisaniline); 1,4-bis (4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy) biphenyl; bis[4-(3-aminophenoxy)phenyl]ketone; bis[4-(3-aminophenoxy)phenyl]sulfide; bis[4-(3-aminophenoxy) phenyl]sulfone; 2,2-bis[4-(3-aminophenoxy)phenyl] propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 3,3'-diaminodiphenylether; 3,4'-diaminodiphenylether; 4,4'-diaminodiphenylether; 3,3'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenylsulfone; 3,4'-diaminodiphenylsulfone; 4,4'-diaminodiphenylsulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy) phenyl]ethane; 1,1-bis[4-(4-aminophenoxy)phenyl]propane; 1,2-bis[4-(4-aminophenoxy)phenyl]propane; 1,3-bis [4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy) phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methyl phenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy) phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis [4-(4-aminophenoxy)phenyl]sulfide; bis[4-(4-aminophenoxy)phenyl]sulfoxide; bis[4-(4-aminophenoxy)phenyl] sulfone; bis[4-(3-aminophenoxy)phenyl]ether; bis[4-(4-aminophenoxy)phenyl]ether; 1,3-bis[4-(4-aminophenoxy) benzoyl]benzene; 1,3-bis[4-(3-aminophenoxy)benzoyl] benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis [3-(3-aminophenoxy)phenyl]-1,1,1,3,3,3- hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenylsulfone; bis[4-{4-(4-aminophenoxy)phenoxy}phenyl]sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; aromatic diamines obtained by substituting a part or all of hydrogen atoms on an aromatic ring of the above-described aromatic diamines with any of: halogen atoms; C1-3 alkyl groups or alkoxyl groups; cyano groups; and C1-3 halogenated alkyl groups or alkoxyl groups in which a part or all of hydrogen atoms of an alkyl group or alkoxyl group are substituted with halogen atoms; and the like.

Examples of the aliphatic diamines include: 1,2-diaminoethane; 1,4-diaminobutane; 1,5-diaminopentane; 1,6-diaminohexane; 1,8-diaminooctane; and the like.

Examples of the alicyclic diamines include: 1,4-diaminocyclohexane; 4,4-methylenebis(2,6-dimethylcyclohexylamine); and the like.

A total amount of the diamines except the aromatic diamines (the aliphatic diamines and the alicyclic diamines) is preferably 20% by mass or less, is more preferably 10% by mass or less, and is further preferably 5% by mass or less of a total amount of the all kinds of the diamines. In other words, an amount of the aromatic diamines is preferably 80% by mass or more, is more preferably 90% by mass or more, and is further preferably 95% by mass or more of the total amount of the all kinds of the diamines.

As tetracarboxylic acids for composing the polyamic acid, aromatic tetracarboxylic acids (including their acid anhydrides), aliphatic tetracarboxylic acids (including their acid anhydrides) and alicyclic tetracarboxylic acids (including their acid anhydrides), which are usually used for polyimide synthesis, can be used. Among them, aromatic tetracarboxylic anhydrides and alicyclic tetracarboxylic anhydrides are preferable, aromatic tetracarboxylic anhydrides are more preferable in the light of the heat resistance, and alicyclic tetracarboxylic acids are more preferable in the light of light transmittance. In the case where they are acid anhydrides, one or two anhydride structures may exist in each of their molecules, but an anhydride having two anhydride structures (dianhydride) is preferable. The tetracarboxylic acids may be used alone or in combination of two kinds or more.

Examples of the alicyclic tetracarboxylic acids include: cyclobutanetetracarboxylic acid; 1,2,4,5-cyclohexanetetracarboxylic acid; 3,3',4,4'-bicyclohexyltetracarboxylic acid; and their anhydrides. Among them, dianhydride having two anhydride structures (for example, cyclobutanetetracarboxylic dianhydride, 1,2,4,5-cyclohexanetetracarboxylic dianhydride, 3,3',4,4'-bicyclohexyltetracarboxylic dianhydride and the like) are preferable. Incidentally, the alicyclic tetracarboxylic acids may be used alone or in combination of two kinds or more.

For obtaining high transparency, an amount of the alicyclic tetracarboxylic acids is preferably 80% by mass or more, is more preferably 90% by mass or more, and is further preferably 95% by mass or more of, for example, a total amount of the all kinds of the tetracarboxylic acids.

The aromatic tetracarboxylic acids are not limited particularly, but a pyromellitic acid residue (which has a structure derived from pyromellitic acid) is preferable, and its anhydride is more preferable. Examples of these aromatic tetracarboxylic acids include: pyromellitic dianhydride; 3,3',4,4'-biphenyltetracarboxylic dianhydride; 4,4'-oxydiphthalic dianhydride; 3,3',4,4'-benzophenonetetracarboxylic dianhydride; 3,3',4,4'-diphenylsulfonetetracarboxylic dianhydride; 2,2-bis[4-(3,4-dicarboxyphenoxy)phenyl]propionic anhydride; and the like.

For obtaining high heat resistance, an amount of the aromatic tetracarboxylic acids is preferably 80% by mass or more, is more preferably 90% by mass or more, and is further preferably 95% by mass or more of, for example, the total amount of the all kinds of the tetracarboxylic acids.

A glass transition temperature of the polyimide film of the present invention is 250° C. or more, is preferably 300° C. or more, and is further preferably 350° C. or more, or it is preferable that the glass transition point is not observed in a region of 500° C. or less. The glass transition temperature in the present invention is obtained by differential thermal analysis (DSC).

A coefficient of linear thermal expansion (CTE) of the polyimide film of the present invention preferably ranges from −5 ppm/K to +20 ppm/K, more preferably ranges from −5 ppm/K to +15 ppm/K, and further preferably ranges from 1 ppm/K to +10 ppm/K. If the CTE is within the above-described range, a difference in coefficient of linear thermal expansion from a general support can be kept to be small, and the polyimide film can be prevented from being peeled off from the support made of an inorganic substance even in a process of heating. Further, as the coefficient of linear thermal expansion of the polyimide film of the present invention in problem, an average value between 30° C. to 200° C. is adopted, but a temperature range to be focused varies according to its intended use. A range from 30° C. to 400° C. and a range from 100° C. to 400° C. can be examined for a high temperature process, a range from 50° C. to 280° C. can be examined for a reflow process, and a range from −50° C. to 150° C. can be focused as a using temperature range.

Breaking strength of the polyimide film of the present invention is 60 MPa or more, is preferably 120 MP or more, and is more preferably 240 MPa or more. An upper limit of the breaking strength is not limited, but is practically less than about 1000 MPa. Herein, the breaking strength of the polyimide film denotes an average value of breaking strength of the polyimide film in its length direction and width direction.

Unevenness of the thickness of the polyimide film of the present invention is preferably 20% or less, is more preferably 12% or less, is further preferably 7% or less, and is particularly preferably 4% or less. If the evenness of the thickness exceeds 20%, the polyimide film tends to be hardly applied to a narrow part. Incidentally, unevenness of a thickness of a film can be obtained based on a below formula from film thicknesses, which are measured at about 10 randomly extracted points of a measured film by using, for example, a contact-type film thickness meter.

$$\text{Unevenness of thickness of film (\%)} = 100 \times (\text{maximum film thickness} - \text{minimum film thickness}) / \text{average film thickness}$$

The polyimide film of the present invention preferably has a form of being wound as a long polyimide film that has a width of 300 mm or more and a length of 10 m or more at the time of its production, and more preferably has a form of a roll-type polyimide film wound around a winding core.

In order to secure handleability and productivity of the polyimide film, lubricant (particles) is preferably added to be contained in the film so as to provide fine ruggedness onto the surface of the polyimide film, thereby securing its slipperiness. The lubricant (particles) is preferably fine particles made of an inorganic substance, and particles made of metal, metal oxide, metal nitride, metal carbide, metallate, phosphate, carbonate, talc, mica, clay, other clay mineral and the like can be used. Preferably, metal oxide, phosphate and carbonate, including silicon oxide, calcium phosphate, calcium hydrogen phosphate, calcium dihydrogen phosphate, calcium pyrophosphate, hydroxyapatite, calcium carbonate and a glass filler can be used. The lubricant may be one kind, or combination of two kinds or more.

A volume average particle diameter of the lubricant (particles) usually ranges from 0.001 μm to 10 μm, preferably ranges from 0.03 μm to 2.5 μm, more preferably ranges from 0.05 μm to 0.7 μm, and further preferably ranges from 0.05 μm to 0.3 μm. This volume average particle diameter is based on a measured value obtained by a light scattering method. If the particle diameter is less than the lower limit, industrial production of the polyimide film becomes difficult, and if the particle diameter is more than the upper limit, the ruggedness on the surface becomes too large so as to weaken its adhering strength, whereby its practical use may be hindered.

An adding amount of the lubricant ranges from 0.02% by mass to 50% by mass, preferably ranges from 0.04% by mass to 3% by mass, and more preferably ranges from 0.08% by mass to 1.2% by mass of a polymer component in the polyimide film. If the adding amount of the lubricant is too small, the effect of adding the lubricant is hard to be expected, and the slipperiness is not secured so much, while the production of the polyimide film may be hindered. If the adding amount is too large, the ruggedness on the surface of the film becomes too large, which may cause problems such as deterioration of the smoothness in spite of the apparent security of the slipperiness, decrease of the breaking strength or breaking elongation of the polyimide film and increase of the CTE of the polyimide film.

In the case where the lubricant (particles) is added to be contained in the polyimide film, the polyimide film may have a single layer in which the lubricant is dispersed uniformly, and may also be, for example, a lubricant concentration inclined-type polyimide film of which one surface is composed of a polyimide film containing the lubricant and the other surface is composed of a polyimide film containing no lubricant or only a small amount of the lubricant. In such a lubricant concentration inclined-type polyimide film, fine ruggedness is added onto the surface of the one layer (film) so as to secure the slipperiness by this layer (film), thereby obtaining the favorable handleability and productivity.

In the case of the lubricant concentration inclined-type polyimide film that can be manufactured by a melt-draw film forming method, it can be obtained by, for example, firstly producing a film from a polyimide film material that contains no lubricant, and applying a resin layer that contains the lubricant onto at least one surface of the film in the film production process. Needless to say, the lubricant concentration inclined-type polyimide film can also be obtained in a reverse manner, that is, by producing a film from the polyimide film material that contains the lubricant, and applying the polyimide film material that contains no lubricant onto the film in the film production process or after completing the film production.

Also in the case of a polyimide film that can be obtained by a solution film forming method, it can be manufactured by using two kinds of polyamic acid solutions (solutions of polyimide precursors) of: a polyamic acid solution containing the lubricant (which preferably has an average particle diameter of about 0.05 μm to about 2.5 μm) by 0.02% by mass to 50% by mass (preferably 0.04% by mass to 3% by mass, and more preferably 0.08% by mass to 1.2% by mass) with respect to the polymer solid content in the polyamic acid solution; and a polyamic acid solution containing no lubricant or only a small amount of the lubricant (preferably less than 0.02% by mass, and more preferably less than 0.01% by mass with respect to the polymer solid content in the polyamic acid solution).

A method for inclining the lubricant concentration (laminating) of the lubricant concentration inclined-type polyimide film is not limited particularly unless causing any problems of cohesion between the both layers, and may be any methods as far as the layers can be cohered without intervening any adhesive layer or the like.

In the case of the polyimide film, for example, i) a method including producing one polyimide film, applying other polyamic acid solution continuously onto this polyimide film and then imidizing the solution, ii) a method including producing one polyamic acid film by flow-casting the one polyamic acid solution, applying other polyamic acid solution continuously onto this polyamic acid film and then imidizing the solution, iii) a method by coextrusion, iv) a method including applying a polyamic acid solution that contains much lubricant onto a film made of a polyamic acid solution that contains no lubricant or only a small amount of lubricant by spray coating, T-die coating or the like, and then imidizing the solution, and the like can be exemplified. In the present invention, the above-described method i) or ii) is preferably employed.

A ratio of thicknesses of the respective layers in the lubricant concentration inclined-type polyimide film is not limited particularly, but a ratio of an (a) layer/a (b) layer is preferably 0.05 to 0.95, where the (a) layer denotes the polymer layer containing a large amount of the lubricant, and the (b) layer denotes the polymer layer that contains no lubricant or only a small amount of the lubricant. If the ratio of the (a) layer/the (b) layer is more than 0.95, the smoothness of the (b) layer is likely to be lost, and if the ratio is less than 0.05, the improvement effect of the surface characteristics becomes insufficient, so that the slipperiness may be lost.

<Surface Activation Treatment of Polyamide Film>

The polyimide film used in the present invention is preferably subjected to surface activation treatment. By the surface activation treatment, the surface of the polyimide film is modified into a state that a functional group exists (so-called an activated state), thereby enhancing affinity for the silane coupling agent.

The surface activation treatment in the present invention is dry or wet surface treatment. As the dry treatment of the present invention, treatment of irradiating the surface with active energy rays such as ultraviolet rays, electron beams and X rays, corona treatment, vacuum plasma treatment, normal pressure plasma treatment, flame treatment, Itro treatment and the like can be employed. As the wet treatment, treatment of allowing the film surface to contact an acid or alkali solution can be exemplified. The surface activation treatment preferably employed in the present invention is plasma treatment and a combination of plasma treatment and wet acid treatment.

The plasma treatment is not limited particularly, and examples thereof include RF plasma treatment in vacuum, microwave plasma treatment, microwave ECR plasma treatment, atmospheric plasma treatment, corona treatment and the like, and also include treatment by gas containing fluorine, ion implantation treatment using an ion source, treatment utilizing a PBII method, flame treatment of exposing to thermal plasma, Itro treatment and the like. Among them, RF plasma treatment in vacuum, microwave plasma treatment and atmospheric plasma treatment are preferable.

As appropriate conditions for the plasma treatment, treatment by: plasma which is known to have a chemically high etching effect including oxygen plasma and plasma containing fluorine such as $CF_4$ and $C_2F_6$; or plasma such as Ne, Ar, Kr and Xe, which has a high effect of physically etching a polymer surface by providing physical energy, is preferable. Further, it is also favorable to add plasma such as $CO_2$, CO, $H_2$, $N_2NH_4$ and $CH_4$ or their mixed gas and water vapor. In addition to these, it is necessary to make plasma which contains at least one kind of a component selected from the group consisting of: OH, $N_2$, N, CO, $CO_2$, H, $H_2$, $O_2$, NH, $NH_2$, $NH_3$, COOH, NO, $NO_2$, He, Ne, Ar, Kr, Xe, $CH_2O$, $Si(OCH_3)_4$, $Si(OC_2H_5)_4$, $O_3H_7Si(OCH_3)_3$, $C_3H_7Si(OC_2H_5)_3$ as gas or a decomposition product in the plasma. For completing the treatment in a short period of time, it is preferable to adopt the plasma which has high energy density, ions with high kinetic energy or high number density of active species, but there is a limitation to increase the energy density because the surface smoothness is necessary. If adopting the oxygen plasma, surface oxidation proceeds, which is advantageous for generating OH groups, but a surface that exhibits poor cohesion with the film itself is likely to be generated, and roughness of the surface becomes large, whereby the cohesion also degrades.

Further, if adopting the plasma using Ar gas, the surface is simply affected by physical collision, whereby the roughness of the surface becomes large also in this case. Taking them into account, microwave plasma treatment, microwave ECR plasma treatment and plasma irradiation by an ion source that can easily implant ions with high energy, a PBII method and the like are also preferable.

In the surface activation treatment, the polymer surface is cleaned, and a more active functional group is generated. The thus generated functional group is bonded with the coupling agent layer by a hydrogen bond or a chemical reaction, whereby the polyimide film layer and the coupling agent layer can be adhered firmly.

In the plasma treatment, an effect for etching the surface of the polyimide film can also be obtained. In particular, in the polyimide film containing a comparatively large amount of the lubricant particles, protrusion made of the lubricant may inhibit the adhesion between the film and the inorganic substrate. In this case, if the surface of the polyimide film is thinly etched by the plasma treatment so as to expose a part of the lubricant particles, and the film is treated by hydrofluoric acid, the lubricant particles near the surface of the film can be removed.

The surface activation treatment may be conducted to only one surface or both surfaces of the polyimide film. In the case of conducting the plasma treatment to one surface, if the polyimide film is put to contact with one of parallel plate-type electrodes in the plasma treatment, only a surface of the polyimide film on a side of not contacting the electrode can be subjected to the plasma treatment. Alternatively, if the polyimide film is put in a state of electrically floating in a space between the two electrodes, the both surfaces can be subjected to the plasma treatment. Further, by conducting the plasma treatment while a protect film is adhered onto one surface of the polyimide film, only one surface can be treated. Incidentally, as the protective film, a PET film, an olefin film and the like with pressure sensitive adhesive attached can be used.

<Film Lamination Method>

In the present invention, by bonding the polyimide films with each other via the silane coupling agent layer, the polyimide film laminate in which the polyimide film layers and the silane coupling agent condensate layer(s) are laminated alternately is obtained.

The polyimide films can be laminated by superimposing the polyimide films so that their surfaces treated by the silane coupling agent may be disposed between the polyimide film layers, and then applying pressure to the polyimide films. Combination of pressure application and heat application is effective.

In the pressure treatment, for example, press, lamination, roll lamination or the like may be carried out while being heated in the atmosphere at the atmospheric pressure or in vacuum. Further, a method of applying pressure and heat to the laminate, while it is in a flexible bag, can also be adopted. In the light of the improvement of the productivity and the reduction of processing cost, which is brought from the high productivity, press or roll lamination is preferably carried out in the atmosphere, and in particular, a method using a roll (roll lamination or the like) is preferable.

Pressure during the pressure treatment preferably ranges from 1 MPa to 20 MPa, and more preferably ranges from 3 MPa to 10 MPa. If the pressure is too high, the support may be broken, and the pressure is too low, the films may partly fail to be cohesive, and adhesion may be insufficient. A temperature during the pressure treatment does not beyond a heat resistant temperature of the used polyimide film. In the case of using nonthermoplastic polyimide films, they are preferably treated at 10° C. to 400° C., and are more preferably treated at 150° C. to 350° C.

Further, the pressure treatment can be carried out in the atmosphere at the atmospheric pressure as described above, but is preferably carried out in vacuum for obtaining stable adhesive strength of full surfaces. At this time, as a degree of the vacuum, a degree of vacuum obtained by an ordinary oil-sealed rotary pump, that is, about 10 Torr or less is sufficient.

As an apparatus that can be used for the pressure and heat treatment, for example, an "11FD" produced by Imoto Machinery Co., Ltd. or the like can be used for pressing in vacuum, and, for example, an "MVLP" produced by MEIKI CO., LTD. or the like can be used for vacuum lamination using a roll film laminator in vacuum or a film laminator for evacuating the air and then applying pressure at once to a full surface of glass by a thin rubber film.

As the pressure treatment, a pressure process and a heat process can be carried out separately.

In this case, firstly, pressure is applied to the polyimide films and the inorganic substrate(s) (preferably at about 0.2 MPa to about 50 MPa) at a comparatively low temperature (for example, at less than 120° C., and more preferably at 95° C. or less) so as to secure their cohesion, and then, the polyimide films and the inorganic substrate (s) are heated at low pressure (preferably at less than 0.2 MPa, and more preferably at 0.1 MPa or less) or normal pressure at a comparative high temperature (for example, at 120° C. or more, more preferably at 120° C. to 250° C., and further preferably at 150° C. to 230° C.), so that a chemical reaction in the cohesion interface can be promoted, whereby the polyimide films and the temporary supporting inorganic substrate(s) can be laminated.

Adhesive strength between the polyimide film layers of the polyimide film laminate of the present invention is 0.1 N/cm or more and 20 N/cm or less, is preferably 0.1 N/cm or more to 10 N/cm, and is more preferably 0.15 N/cm or more to 6 N/cm, which is measured by a 90° peel test.

Further, the adhesive strength between the polyimide film layers of the present invention after being heated at 400° C. for 15 minutes is 20% or more and 200% or less of the initial adhesive strength. According to the manufacturing method described in the present invention, the polyimide film laminate satisfying the above-described functions can be obtained.

EXAMPLES

Hereinafter, the present invention will be described more specifically by way of examples and comparative examples, but the present invention is not limited to the following examples. Incidentally, methods for evaluating physical properties in the below-described examples will be as follows.

1. Reduced Viscosity of Polyamic Acid (ηsp/C)

Reduced viscosity of a solution obtained by dissolving polyamic acid into N-methyl-2-pyrrolidone (or N,N-dimethylacetamide) so that its polymer concentration may be 0.2 g/dl was measured using a Ubbelohde's viscosity tube at 30° C. (in the case of using N,N-dimethylacetamide as the solvent for preparing the polyamic acid solution, the polymer was dissolved into N,N-dimethylacetamide, and then its reduced viscosity was measured).

2. Thicknesses of Polyimide Film and the Like

Thicknesses of a polyimide film and the like were measured by a micrometer (Millitron 1245D produced by Feinpruf GmbH).

3. Tensile Elasticity, Tensile Bbreaking Strength and Tensile Breaking Elongation of Polyimide film The polyimide film to be measured was cut into a strip shape of 100 mm×10 mm respectively in a flow direction (MD direction) and in a width direction (TD direction), thereby producing a test piece. Tensile elasticity, tensile breaking strength and tensile breaking elongation of the test piece in the MD direction and the TD direction were measured respectively at tensile speed of 50 mm/minute and a distance between chucks of 40 mm by a tensile tester (Autograph®, Trade Name of AG-5000A, produced by Shimadzu Corporation).

4. Adhesive Strength by 90° Method

Adhesive strength between the polyimide film layers of the polyimide film laminate was obtained by a 90° peel method in accordance with JISK6854-1.

Device name: Autograph AG-IS produced by Shimadzu Corporation
Measured temperature: Room Temperature
Peeling speed: 50 mm/min
Ambience: Atmosphere
Width of measured sample: 1 cm A surface of the polyimide film laminate having a square shape with sides of 100 m was cut at a depth of 120% of a thickness of its outermost polyimide film, and the outermost polyimide film was peeled off from an end of the laminate, whereby the adhesive strength of the sample was measured. The adhesive strength was measured in an initial state and after heat treatment at 400° C. for 15 minutes. In the heat treatment, the test sample was put into a muffle furnace, in which it is heated at 400° C. in nitrogen atmosphere with nitrogen gas flowing therein, while an opening time of a door of the muffle furnace was limited within 5 seconds, and the door of the muffle furnace was then opened after a predetermined time so as to cool the sample naturally by the atmosphere. Thereafter, the adhesive strength of the sample was measured at a room temperature and the atmospheric pressure by a method similar to the measurement in the initial state.

5. Coefficient of Linear Thermal Expansion (CTE)

Expansion/contraction rates of the polyimide film in a flow direction (MD direction) and a width direction (TD direction) were respectively measured in below-described conditions, and expansion/contraction rates over time were measured at every 15° C. such as 30° C. to 45° C., 45° C. to 60° C., etc., up to 300° C., thereby calculating an average value of the all measured values as a CTE.

Device name: TMA4000S produced by MAC Science Corporation
Length of sample: 20 mm
Width of sample: 2 mm
Start temperature in rising temperature: 25° C.
End temperature in rising temperature: 400° C.
Rising rate of temperature: 5° C./min
Atmosphere: Argon
Initial Load: 34.5 g/mm$^2$ 6. Average Particle Diameter of Inorganic Particles Inorganic particles to be measured were dispersed into solvent as described below, and their particle diameter distribution was obtained by using a laser scattering particle size analyzer LB-500 produced by HORIBA, Ltd., thereby calculating a weight (volume) average particle diameter and a CV value of the inorganic particles.

7. Thickness of Coupling Agent Condensate Layer

A film thickness of a silane coupling agent condensate layer was obtained by polishing a cross section of the polyimide film laminate which is taken in a direction perpendicular to a film surface, cutting it into a ultrathin section by a microtome, taking a photograph of the cross section using a transmission electron microscope, and calculating an actual value back with magnification of the transmission electron microscope.

8. Bending Elastic Modulus

A bending elastic modulus was measured at a testing temperature of 23° C. in accordance with JIS K7171. A size of the test piece was 10 mm×80 mm×thickness 4 mm in width.

9. Izod Impact Strength (With no Notch)

Impact strength of the test piece was evaluated according to a method specified in JIS K7110. Its measurement temperature was 23° C. A size of the test piece was equal to that of the sample for measuring the bending elastic modulus.

Production of Polyimide Film

Production Example 1

(Preparation of Polyamic Acid Solution)

After replacing an inside of a reaction vessel, which was provided with a nitrogen gas introducing tube, a thermometer and a stirring bar, with nitrogen, 398 parts by mass of 3,3',4,4'-biphenyltetracarboxylic dianhydride (BPDA) and 147 parts by mass of paraphenylenediamine (PDA) were added to be dissolved into 4600 parts by mass of N,N-dimethylacetamide, dispersion obtained by dispersing colloidal silica into dimethylacetamide ("SNOWTEX (Registered Trademark) DMAC-ST30" produced by NISSAN CHEMICAL INDUSTRIES, LTD) was added as a lubricant so that a concentration of the silica (lubricant) might be 0.15% by mass of a total amount of polymer solid contents in the polyamic acid solution, and the mixture was stirred at a reaction temperature of 25° C. for 24 hours, thereby obtaining a brown and viscous polyamic acid solution V1 which has reduced viscosity shown in Table 1.

(Production of Polyimide Film)

The above-obtained polyamic acid solution V1 was applied onto a smooth surface (no lubricant surface) of a long polyester film ("A-4100" produced by TOYOBO CO., LTD.) having a width of 1050 mm by using a slit die so that a final film thickness (film thickness after the imidization) might be 25 µm, was dried at 105° C. for 20 minutes, and was peeled off from the polyester film, thereby obtaining a self-supporting polyamic acid film that had a width of 920 mm.

Subsequently, the thus obtained self-supporting polyamic acid film was treated by heat using a pin tenter, while its temperature was increased stepwisely in a temperature range from 150° C. to 420° C. (at 180° C. for 5 minutes in a first stage; at 270° C. for 10 minutes in a second stage; and at 420° C. for 5 minutes in a third stage), so as to be imidized, and pin holding parts at both ends were cut off by a slit, thereby obtaining a long polyimide film F1 (roll of 1000 m) having a width of 850 mm. Characteristics of the obtained film F1 will be shown in Table 1.

Production Example 2

(Preparation of Polyamic Acid Solution)

After replacing an inside of a reaction vessel, which was provided with a nitrogen gas introducing tube, a thermometer and a stirring bar, with nitrogen, 223 parts by mass of 5-amino-2-(p-aminophenyl)benzoxazole (DAMBO) and 4416 parts by mass of N,N-dimethylacetamide were added so as to be dissolved with each other completely, thereafter, dispersion obtained by dispersing colloidal silica into dimethylacetamide ("SNOWTEX (Registered Trademark) DMAC-ST30" produced by NISSAN CHEMICAL INDUSTRIES, LTD) was added as a lubricant together with 217 parts by mass of pyromellitic dianhydride (PMDA) so that a concentration of the silica (lubricant) might be 0.12% by mass of a total amount of polymer solid contents in the polyamic acid solution, and the mixture was stirred at a reaction temperature of 25° C. for 24 hours, thereby obtaining a brown and viscous polyamic acid solution V2 which had reduced viscosity shown in Table 1.

(Production of Polyimide Film)

After obtaining a polyamic acid film using the polyamic acid solution V2 as described above, instead of the polyamic acid solution V1, by the similar method, the polyamic acid film was treated by heat at 150° C. for 5 minutes in a first stage; at 220° C. for 5 minutes in a second stage; and at 485° C. for 10 minutes in a third stage using a pin tenter so as to be imidized, and pin holding parts at both ends were cut off by a slit, thereby obtaining a long polyimide film F2 (roll of 1000 m) having a width of 850 mm. Characteristics of the obtained film F2 will be shown in Table 1.

Production Example 3

(Preparation of Polyamic Acid Solution)

Polyamic acid solution V3 was obtained by operations similar to those in Production example 2 except for not adding the dispersion obtained by dispersing colloidal silica into dimethylacetamide ("SNOWTEX (Registered Trademark) DMAC-ST30" produced by NISSAN CHEMICAL INDUSTRIES, LTD).

(Production of Polyimide Film)

The polyamic acid solution V2 obtained as described above was applied onto a smooth surface (no lubricant surface) of a long polyester film ("A-4100" produced by TOYOBO CO., LTD.) that had a width of 1050 mm using a comma coater so that a final film thickness (film thickness after the imidization) might be about 5 µm, and thereafter, the polyamic acid solution V3 was further applied thereto using a slit die so that a final film thickness might be 38 µm including the film thickness of V2, was dried at 105° C. for 25 minutes, and then was peeled off from the polyester film, thereby obtaining a self-supporting polyamic acid film that had a width of 920 mm.

Subsequently, the obtained self-supporting polyamic acid film was treated by heat using a pin tenter at 180° C. for 5 minutes in a first stage, at 220° C. for 5 minutes in a second stage and at 495° C. for 10 minutes in a third stage so as to be imidized, and pin holding parts at both ends were cut off by a slit, thereby obtaining a long polyimide film F3 (a roll of 1000 m) having a width of 850 mm. Characteristics of the obtained film F3 will be shown in Table 1.

Besides them, commercially available heat resistant films were used similarly in Examples and Comparative Examples.

F4: Kapton 100EN (polyimide film produced by DU PONT-TORAY CO., LTD., thickness of 25 µm)

F5: UPILEX-50S (polyimide film produced by Ube Industries, Ltd., thickness of 50 µm)

F6: APICAL NPI (polyimide film produced by KANEKA CORPORATION, thickness of 125 µm)

F7: POMIRAN N (polyimide film produced by Arakawa Chemical Industries, Ltd., thickness of 38 µm)

F8: VECSTAR CT-Z (liquid crystal polymer film produced by KURARAY Co., LTD., thickness of 75 µm)

TABLE 1

|  |  |  | Production example 1 | Production example 2 | Production example 3 |
|---|---|---|---|---|---|
| Polyamic acid solution |  |  | V1 | V2 | V2/V3 |
| Tetra-carboxylic anhydrides | PMDA | Part by mass | — | 217 | 217 |
|  | BPDA |  | 398 | — | — |
| Diamines | PDA |  | 147 | — | — |
|  | DAMBO |  | — | 223 | 223 |
| Silica |  | [%] | 0.15 | 0.12 | 0.12/0.00 |
| Reduced viscosity | η sp/c |  | 3.8 | 3.5 | 3.5 |
| Film |  |  | F1 | F2 | F3 |
| Film thickness |  | μm | 25 | 25 | 38 |
| Unevenness of film thickness |  | % | 1.7 | 1.0 | 1.1 |
| CTE (MD/TD) |  | ppm/° C. | 9.7/8.2 | 0.8/1.2 | 1.5/1.8 |

<Vacuum Plasma Treatment of Polyimide Film>

As a previous process for treating the polyimide film by the silane coupling agent, vacuum plasma treatment was performed to the polyimide film. For the vacuum plasma treatment, a device for sheet glass was used, glass was set into the device so that a metal mask might be superimposed onto the glass so as to face a surface of the glass to be treated by the silane coupling agent, an inside of a vacuum chamber was evacuated until its pressure became $1\times10^{-3}$ Pa or less, argon gas was introduced into the vacuum chamber, and then, the surface of the glass plate was treated by plasma of argon gas in conditions of discharge electric power of 100 W and frequency of 15 kHz for 20 seconds.

Silane Coupling Agent Treatment Example 1

Using a device for generating vapor of the silane coupling agent, whose outline is illustrated in the FIGURE, the polyimide film was treated by the silane coupling agent in following conditions. The polyimide film was held vertically by a stainless steel frame having an opening of 370 mm×470 mm in the chamber in which the vapor of the silane coupling agent was to be introduced.

After controlling a temperature of a case that stores 100 g of the silane coupling agent ("KBM-903" produced by Shin-Etsu Chemical Co., Ltd.; 3-aminopropyltrimethoxysilane) at 40° C., nitrogen gas was sent into the case at a flow rate of 10 L/min by bubbling, the generated nitrogen gas that contained the vapor of the silane coupling agent was introduced into the chamber through a pipe, and both surfaces of the polyimide film were exposed to the gas for 20 minutes. Thereafter, the film was taken out from the chamber, and was heated at 110° C. in a clean dry oven for 1 minute, thereby completing the silane coupling agent treatment.

Silane Coupling Agent Treatment Example 2

Operations were carried out similarly to those in Treatment example 1 except that the time period for exposing the polyimide film to the nitrogen gas that contained the silane coupling agent was changed to 10 minutes.

Silane Coupling Agent Treatment Example 3

Operations were carried out similarly to those in Treatment example 1 except that the time period for exposing the polyimide film to the nitrogen gas that contained the silane coupling agent was changed to 5 minutes.

Silane Coupling Agent Treatment Example 4

Ina clean glass container, 0.5 parts by mass of the silane coupling agent ("KBM-903" produced by Shin-Etsu Chemical Co., Ltd.; 3-aminopropyltrimethoxysilane) and 99.5 parts by mass of isopropyl alcohol were mixed and stirred so as to obtain a silane coupling agent solution.

The polyimide film was temporarily adhered to a Pyrex (Registered Trademark) glass temporary supporting substrate having a size of 300 mm×300 mm×0.7 mmt, whose surface was coated with slightly sticky silicone resin, and was set into a spin coater produced by Japan Create Co., Ltd. Then, 50 ml of isopropyl alcohol was firstly dropped to a center of the film, and was spun off by being rotated at 500 rpm so as to wash the film, and thereafter, about 30 ml of the above prepared silane coupling agent solution was dropped to the center of the film, and was spun off by being rotated at 500 ml for 10 seconds and subsequently at rotation speed increased to 1500 rpm for 20 seconds. Thereafter, the film with the temporary supporting substrate was taken out from the stopped spin coater, and was heated at 100° C. in a clean oven for 3 minutes, and the polyimide film was peeled off from the temporary supporting substrate.

Hereinafter, silane coupling agent treatment was carried out similarly except for using other silane coupling agents. The used silane coupling agents will be listed as follows.

SC1: KBM-903 (produced by Shin-Etsu Chemical Co., Ltd.), 3-aminopropyltrimethoxysilane SC2: KBM-403 (produced by Shin-Etsu Chemical Co., Ltd.), 3-glycidoxypropylmethoxysilane SC3: KBM-603 (produced by Shin-Etsu Chemical Co., Ltd.), N-2-(aminoethyl)-3-aminopropyltrimethoxysilane SC4: KBE-585 (produced by Shin-Etsu Chemical Co., Ltd.), 3-ureidopropyltrialkoxysilane Examples 1 to 14, Comparative Examples 1 to 2

The five above-obtained silane coupling agent-treated substrates were superimposed so as to respectively sandwich release sheets therebetween, and pressure of 100 Pa was applied to the substrates by a vacuum press under reduced pressure, thereby temporarily adhering the substrates. Subsequently, the obtained temporarily adhered laminated plate was heated at 200° C. in nitrogen atmosphere in a clean oven for 1 hour, thereby obtaining the polyimide film laminate of the present invention.

Results of evaluations of the obtained laminate will be shown in Table 2.

Hereinafter, polyimide film laminates in the combinations shown in Tables 2 and 3 were produced and evaluated similarly to the above. Results will be shown in Table 2.

Incidentally, the film used in Comparative Example 2 was not a polyimide film, although it is also listed in the same table for convenience. This film was melt during the heating test at 400° C., its adhesive strength after the heating test could not be measured.

TABLE 2

|  | Example 1 | Example 2 | Example 3 | Example 4 | Example 5 | Example 6 | Example 7 | Example 8 |
|---|---|---|---|---|---|---|---|---|
| Polyimide film | F1 | F2 | F3 | F2 | F2 | F2 | F2 | F2 |
| Vacuum plasma treatment | Conducted | Conducted | Conducted | Conducted | Conducted | Conducted | Conducted | Conducted |
| Silane coupling agent treatment method | Treatment example 1 | Treatment example 1 | Treatment example 1 | Treatment example 2 | Treatment example 3 | Treatment example 4 | Treatment example 4 | Treatment example 4 |

TABLE 2-continued

|  |  | Example 1 | Example 2 | Example 3 | Example 4 | Example 5 | Example 6 | Example 7 | Example 8 |
|---|---|---|---|---|---|---|---|---|---|
| Silane coupling agent |  | SC1 | SC1 | SC1 | SC1 | SC1 | SC1 | SC2 | SC3 |
| Thickness of silane coupling agent condensate layer | [nm] | 210 | 200 | 210 | 90 | 40 | 650 | 630 | 710 |
| Adhesive strength of polyimide film (Initial stage) | [N/cm] | 2.4 | 1.9 | 1.8 | 2.1 | 2.5 | 3.5 | 2.7 | 2.6 |
| Adhesive strength of polyimide film (After heating) | [N/cm] | 2.6 | 2.2 | 1.5 | 2.4 | 3.1 | 1.7 | 1.3 | 0.7 |
| Adhesive strength ratio (After heating/Initial stage) |  | 1.08 | 1.16 | 0.83 | 1.14 | 1.24 | 0.49 | 0.48 | 0.27 |

TABLE 3

|  |  | Example 9 | Comparative example 1 | Example 10 | Example 11 | Example 12 | Example 13 | Comparative example 2 | Example 14 |
|---|---|---|---|---|---|---|---|---|---|
| Polyimide film |  | F2 | F2 | F4 | F5 | F6 | F7 | F8 | F2 |
| Vacuum plasma treatment |  | Conducted | Conducted | Conducted | Conducted | Conducted | Conducted | Conducted | Not conducted |
| Silane coupling agent treatment method |  | Treatment example 4 | None | Treatment example 2 | Treatment example 2 | Treatment example 2 | Treatment example 2 | Treatment example 2 | Treatment example 2 |
| Silane coupling agent |  | SC4 | — | SC1 | SC1 | SC1 | SC1 | SC1 | SC1 |
| Thickness of silane coupling agent condensate layer | [nm] | 680 | — | 100 | 90 | 100 | 90 | 90 | 110 |
| Adhesive strength of polyimide film (Initial stage) | [N/cm] | 0.8 | 0.05 | 3.1 | 2.2 | 2.1 | 2.4 | 0.1 | 0.8 |
| Adhesive strength of polyimide film (After heating) | [N/cm] | 1.3 | 0 | 2.8 | 2.4 | 2.6 | 2.1 | — | 1.0 |
| Adhesive strength ratio (After heating/Initial stage) |  | 1.63 | 0.00 | 0.90 | 1.09 | 1.24 | 0.88 | — | 1.25 |

Examples 15 to 24

The 160 above-obtained silane coupling agent-treated substrates, which adopted the films of 25 μm, or the 100 silane coupling agent-treated substrates, which adopted the films of 38 μm, were superimposed so as to sandwich release sheets therebetween respectively, and pressure of 100 Pa was applied to the substrates by a vacuum press under reduced pressure, whereby the substrates were adhered temporarily. Subsequently, the temporarily adhered laminated plate was heated at 200° C. in nitrogen atmosphere in a clean oven for 1 hour, thereby obtaining the polyimide film laminate of the present invention which had a thickness of 4 mm. Results of evaluations of the obtained laminate will be shown in Tables 4 and 5.

Comparative Examples 3 and 4

A film 4 having a thickness of 25 μm was coated with epoxy adhesive so that its thickness of the epoxy adhesive might be 5 μm, the 135 coated films were superimposed to each other and were thermoset at 150° C. for 1 hour, thereby obtaining a laminated plate of Comparative example 3 having a thickness of 4 mm. Evaluation results of the obtained laminated plate will be shown in Table 4. Similarly, a laminated plate of Comparative Example 4 was obtained using a film 1. Evaluation results thereof will be shown in Table 4. Either of them exhibited a lower bending elastic modulus and lower impact strength than those of Examples.

TABLE 4

|  |  | Example 15 | Example 16 | Example 17 | Example 18 | Example 19 | Example 20 |
|---|---|---|---|---|---|---|---|
| Polyimide film |  | F1 | F2 | F3 | F1 | F2 | F3 |
| Vacuum plasma treatment |  | Conducted | Conducted | Conducted | Conducted | Conducted | Conducted |
| Silane coupling agent treatment method |  | Treatment example 1 | Treatment example 1 | Treatment example 1 | Treatment example 4 | Treatment example 4 | Treatment example 4 |
| Silane coupling agent |  | SC1 | SC1 | SC1 | SC1 | SC1 | SC1 |
| Thickness of silane coupling agent condensate layer | [nm] | 210 | 200 | 210 | 650 | 650 | 650 |
| Bending elastic modulus | GPa | 9.7 | 10.2 | 10.1 | 9.8 | 10.3 | 10.1 |
| Izod impact strength | kJ/m$^2$ | 340 | 360 | 355 | 335 | 360 | 360 |

TABLE 5

|  | Example 21 | Example 22 | Example 23 | Example 24 | Comparative example 3 | Comparative example 4 |
|---|---|---|---|---|---|---|
| Polyimide film | F4 | F5 | F6 | F7 | F4 | F1 |
| Vacuum plasma treatment | Conducted | Conducted | Conducted | Conducted | Not conducted | Not conducted |
| Silane coupling agent treatment method | Treatment example 2 | Treatment example 2 | Treatment example 2 | Treatment example 2 | None | None |
| Silane coupling agent | SC1 | SC1 | SC1 | SC1 | Adhesive | Adhesive |
| Thickness of silane coupling agent condensate layer [nm] | 100 | 90 | 100 | 90 | — | — |
| Bending elastic modulus GPa | 5.2 | 8.8 | 5.8 | 5.1 | 3.2 | 4.3 |
| Izod impact strength kJ/m$^2$ | 120 | 320 | 110 | 230 | 80 | 55 |

INDUSTRIAL APPLICABILITY

The film laminated plate of the present invention is composed of organic substances, but nevertheless has the heat resistance of 400° C., and thus can be used as an alternate for an inorganic substance such as glass and ceramic. In particular, if using the technique of the present invention, a thick sheet and even a plate can be produced by repeating the lamination. By machining them, they can be used more like engineering plastic. Further, by cutting them into fine pieces, they can be used also for a heat-resistant and lightweight spacer and the like.

DESCRIPTION OF REFERENCE SIGNS

100 vacuum chamber
101 vacuum pump
102 flowmeter
200 work (substrate)
300 hot plate
400 warm bath

The invention claimed is:

1. A polyimide film laminate, comprising a structure of superimposing plural polyimide film layers and silane coupling agent condensate layers alternately to each other, wherein
    a thickness of each of the polyimide film layers is 3 μm or more and 250 μm or less,
    the number of polyimide film layers is 5 or more,
    all of the polyimide film layers in the polyimide film laminate have the same composition,
    initial adhesive strength between the polyimide film layers is 0.1 N/cm or more and 20 N/cm or less by a 90° peel method, and
    adhesive strength between the polyimide film layers after being heated at 400° C. for 15 minutes is 20% or more and 200% or less of the initial adhesive strength.

2. The polyimide film laminate according to claim 1, wherein a thickness of the silane coupling agent condensate layer is 5 nm or more and 300 nm or less.

3. A method for manufacturing a polyimide film laminate, the method comprising at least:
    (1) producing a silane coupling agent layer on a surface of a polyimide film; and
    (2) superimposing 5 or more polyimide films after the production of the silane coupling agent layers, and applying heat and pressure to the superimposed polyimide films,
    wherein all of the 5 or more polyimide films in the polyimide film laminate have the same composition.

4. The method for manufacturing a polyimide film laminate according to claim 3, wherein the step of (1) producing the silane coupling agent layer on the surface of the polyimide film is carried out by exposing the surface of the polyimide film to a vaporized silane coupling agent.

\* \* \* \* \*